United States Patent
Malawer et al.

(10) Patent No.: US 6,806,334 B2
(45) Date of Patent: Oct. 19, 2004

(54) PROLIFEROUS COPOLYMER OF VINYL PYRROLIDONE AND VINYL ACETATE

(75) Inventors: Edward G. Malawer, Wayne, NJ (US); James P. Cullen, Bartonsville, PA (US); Chi-San Wu, Wayne, NJ (US); Laurence Senak, Livingston, NJ (US); William J. Drefko, Kearny, NJ (US); David K. Hood, Basking Ridge, NJ (US); Peter J. Brush, Andover, NJ (US)

(73) Assignee: ISP Investments Inc., Wilmington, DE (US)

( * ) Notice: Subject to any disclaimer, the term of this patent is extended or adjusted under 35 U.S.C. 154(b) by 82 days.

(21) Appl. No.: 10/663,565

(22) Filed: Sep. 16, 2003

(65) Prior Publication Data

US 2004/0054066 A1 Mar. 18, 2004

Related U.S. Application Data

(63) Continuation-in-part of application No. 10/071,753, filed on Feb. 7, 2002, now Pat. No. 6,620,900.

(51) Int. Cl.$^7$ ............................................. C08F 26/08
(52) U.S. Cl. ........................ 526/264; 526/330; 424/464
(58) Field of Search ............................... 526/264, 330; 424/464

(56) References Cited

U.S. PATENT DOCUMENTS

| | | | | |
|---|---|---|---|---|
| 4,658,002 A | * | 4/1987 | Tschang et al. | 526/264 |
| 5,091,184 A | * | 2/1992 | Khanna | 424/435 |
| 5,393,825 A | * | 2/1995 | Tseng et al. | 524/548 |
| 5,567,786 A | * | 10/1996 | Tseng et al. | 526/264 |
| 5,594,013 A | * | 1/1997 | Trigger | 514/356 |
| 5,599,898 A | * | 2/1997 | Hartmann et al. | 528/310 |
| 5,663,258 A | * | 9/1997 | Zhong et al. | 526/264 |
| 6,171,583 B1 | * | 1/2001 | Breitenbach et al. | 424/78.25 |
| 6,524,617 B1 | * | 2/2003 | Moroni et al. | |
| 2002/0128293 A1 | * | 9/2002 | Rampal et al. | |
| 2003/0008006 A1 | * | 1/2003 | Puthli et al. | |

* cited by examiner

*Primary Examiner*—Helen L. Pezzuto
(74) *Attorney, Agent, or Firm*—Walter Katz; William J. Davis; Marilyn J. Maue

(57) ABSTRACT

What is described herein is an excipient for a pharmaceutical tablet which is a proliferous copolymer of vinyl pyrrolidone and vinyl acetate, to provide the tablet with rapid dissolution and disintegration properties, and, also reduced hygroscopicity.

5 Claims, 2 Drawing Sheets

PROLIFEROUS COPOLYMER OF VINYL PYRROLIDONE AND VINYL ACETATE

CROSS-REFERENCE TO RELATED U.S. PATENT APPLICATIONS

This application is a continuation-in-part of U.S. patent application Ser. No. 10/071,753, filed Feb. 7, 2002, Pat. No. 6,620,900 B2 and assigned to the same assignee as herein.

BACKGROUND OF THE INVENTION

1. Field of the Invention

This invention relates to an excipient for a pharmaceutical tablet and, more particularly, to an excipient which is a proliferous copolymer of vinyl pyrrolidone and vinyl acetate, providing the tablet with both rapid dissolution and disintegration properties, and reduced hygroscopicity.

2. Description of the Prior Art

Zhong, Y. et al, in U.S. Pat. No. 5,663,258, described a strongly swellable, moderately crosslinked copolymer of vinyl pyrrolidone and vinyl acetate made by precipitation polymerization in the presence of a free radical initiator. The copolymer obtained by this process had unique gel volume and viscosity properties which enabled it to thicken aqueous and non-aqueous solutions effectively. Meffert, H., in EP 0979649A2, also described copolymers of vinyl pyrrolidone and vinyl acetate made by free radical polymerization, optionally with an added crosslinking agent, which process provided copolymers having K-value of 50 to 200. Such copolymers were considered suitable for use as a matrix material in pharmaceutical or cosmetic preparations.

Blankenburg, R. et al, in U.S. Pat. No. 5,635.169, also described a free radical process for making copolymers of vinyl pyrrolidone and vinyl acetate having a K-value of 30–50 for use in cosmetic formulations.

Tseng, S. et al, in U.S. Pat No. 5,393,854, described the preparation of the isomeric compound 1-vinyl-3(E)-ethylidene pyrrolidone (EVP) having the formula:

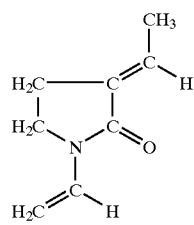

which, in solid form, had a purity of at least 95% and were white, needle-shaped crystals having a melting point of 59–61° C. This isomeric compound was used as a crosslinking agent in the proliferous polymerization of vinyl pyrrolidone.

Tseng, S. et al in U.S. Pat. No. 5,393,854, also described a polyrmerizable composition of vinyl pyrrolidone and isomeric EVP for proliferous polymerization of vinyl pyrrolidone.

Accordingly, it is an object of the present invention to provide a proliferous copolymer of vinyl pyrrolidone and vinyl acetate for use as efficient excipient for drugs, which provides the drug tablet with both rapid dissolution and disintegration properties at predetermined pH levels, and reduced hygroscopicity.

SUMMARY OF THE INVENTION

What is described herein are pharmaceutical excipients for drug tableting which are proliferous copolymers of vinyl pyrrolidone (VP) and vinyl acetate (VA), which provides the tablets with both rapid dissolution and disintegration properties, and reduced hygroscopicity. In particular, the proliferous copolymers of vinyl pyrrolidone and vinyl acetate of the invention exhibit comparably rapid dissolution and disintegration properties under aqueous acidic conditions as compared to a proliferous polyvinylpyrrolidone homopolymer, as well as excellent moisture resistance (reduced hygroscopicity) in the dry state (which is attributed to their increased hydrophobicity).

The pharmaceutical tablet releases at least 80% of the drug within 20 minutes and 100% within 35 minutes, under aqueous acidic conditions, and picks up less than 14.6% moisture at a constant humidity value of 55%.

A typical proliferous copolymer of the invention consists essentially of, by weight, about 60–90% VP, about 10–40% VA, and crosslinker, preferably about 75–82% VP, about 18–25% VA and about 0.8–1.2% crosslinker.

The proliferous copolymer of the invention is made by providing a polymerization mixture of, VP, VA and crosslinker, at a temperature of about 80–100° C. heating until proliferous polymerization occurs, and then recovering the desired copolymer.

IN THE DRAWINGS

DETAILED DESCRIPTION OF THE INVENTION

In accordance with the invention, there is provided herein a proliferous copolymer of vinyl pyrrolidone and vinyl acetate which is an effective and advantageous excipient for drugs, and which is capable of effecting rapid dissolution and disintegration of drug tablets at various pH levels, while exhibiting excellent moisture resistance (reduced hygroscopicity) even with increasing humidity.

Suitable crosslinkers include ethylidene-vinyl pyrrolidone (EVP), divinyl imidazolidone (DVI), N,N-methylenebisacrylamide and allyl methacrylate. EVP is preferred. The crosslinker must be added to the polymerization mixture.

In a typical run, the monomers of VP and VA, and crosslinker, and water, are held in a sealed stirred reactor under a nitrogen atmosphere at about 80° C. until the reaction mixture pops, i.e. proliferous polymerization occurs, whereupon solid white particles appear. Generally the reaction time is about 2–5 hours. The contents are then left for an additional hour, cooled and discharged. The reaction product, i.e. the crosslinked copolymer, is water-washed, filtered, and thereafter it is dried in a vacuum oven at 70° C. The yield is about 70–95%.

Typical reaction mixtures for preparing proliferous copolymers with various amounts of VA and crosslinker are given in Table 1 below.

TABLE 1

| Ex. | % VP | % VA | Crosslinker | % Crosslinker* |
|---|---|---|---|---|
| 1 | 74.9 | 24.0 | EVP | 1.12 |
| 2 | 82.6 | 16.8 | EVP | 0.59 |
| 3 | 78.2 | 21.3 | EVP | 0.50 |
| 4 | 75.1 | 22.8 | EVP | 2.06 |

*Based on monomer physically added, wt/wt.

Figure 1:
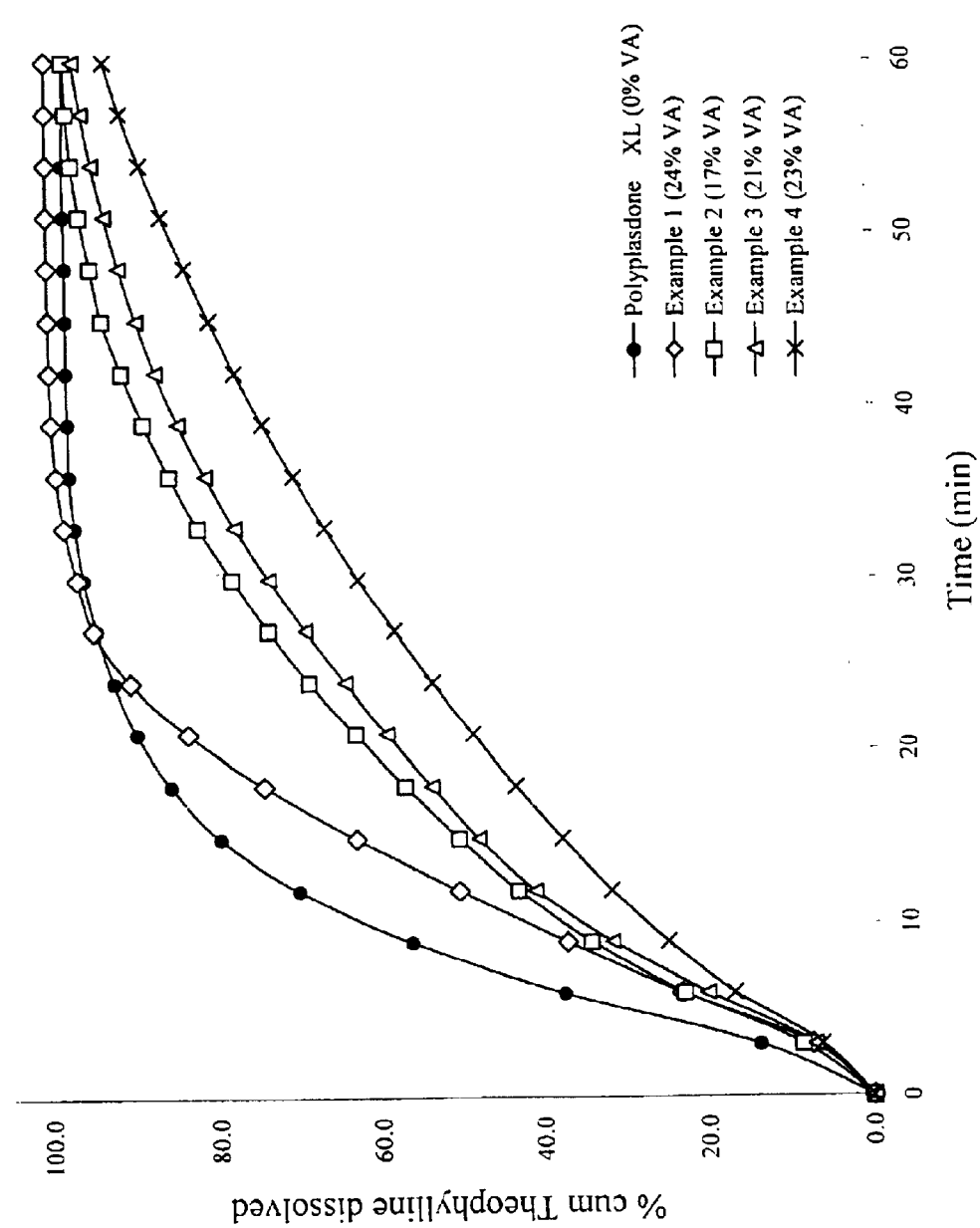
FIG. 1 is a graph of Cumulative % Drug Release vs. Time for proliferous copolymers of VP/NA of the invention compared to crosslinked PVP (0% VA) (Polyplasdone® XL).

Suitable pharmaceutical excipient formulations with theophylline as a model drug were prepared as shown in Table 2, with the proliferous-VP/VA copolymers of the invention (Ex. 1–4) and a control using Polyplasdone® XL (0% VA) (ca. 2% crosslinker). FIG. 1 shows the dissolution performances of these formulations under aqueous acidic conditions.

TABLE 2*

| Component | Ex. 1–4 | Control |
|---|---|---|
| Theophylline | 50 | 50 |
| Copolymer VP/VA of Invention | 2 | — |
| Polyplasdone ® XL | — | 2 |
| Lactose (direct tableting) | 47 | 47 |
| Cab-O-Sil | 0.5 | 0.5 |
| Mg Stearate | 0.5 | 0.5 |

*The formulations were comparable in tablet weight, thickness, hardness, friability and compression force.

FIG. 1 establishes that Polyplasdone® XL (0% VA) (ca. 2% crosslinker) had a strong initial bursting effect and released 88% of the drug within 20 minutes. The formulation containing the proliferous VP/NA copolymer of the invention (with 1.12% crosslinker) also showed rapid dissolution; Ex. 1 released 80% of the drug within 20 minutes. Both of these formulations released 100% of the drug in approximately 35 minutes. Less optimum formulations containing proliferous VP/NA copolymers, Ex. 2–3, with only ~0.5% crosslinker required 31–35 minutes to release 80% of the drug. Both formulations released almost 100% of the drug in an hour. Example 4, which is a proliferous VP/NA copolymer formulation containing a standard level (i.e. 2.06%) of EVP crosslinker, released 80% of the drug in 44 minutes with less than 95% released in one hour.

Table 3 and FIG. 2 below shows the effective moisture resistance (reduced hygroscopicity) property of the proliferous copolymer of the invention.

A comparative evaluation of the hygroscopicity of several crosslinked P(VP/VA) samples and commercially produced Polyplasdone® XL and Plasdone® S-630 was completed.

The hygroscopicity test was conducted at room temperature (200° C.). Each of the samples were exposed to four different humidity levels for a period of seven days. The desired humidity levels were achieved by using four different saturated salt solutions maintained in the bottom of large glass desiccators. Humidity levels of 15%, 32.3%, 55% and 85% were established with saturated salt solutions of lithium chloride, calcium chloride, magnesium nitrate and potassium chloride, respectively. The humidity levels of these saturated solutions (at 20° C.) were obtained from the CRC Handbook of *Chemistry and Physics* (60<sup>th</sup> Edition) and *Lange's Handbook of Chemistry* (14<sup>th</sup> Edition). All samples were weighed into individual aluminum weighing dishes (~2 grams—uniformly spread). The samples were placed in a vacuum oven, at 45° C. for 24 hours prior to the initial percent moisture evaluation. After the initial percent moisture was obtained, the samples were placed inside the desiccators for seven days. On day seven, the samples were removed and the final moisture result was measured. The initial and final percent water values were obtained using direct Karl Fischer moisture titration. Table 3 below lists the results for each of the samples at the four humidity levels.

TABLE 3

| Sample | % Water Initial | % Water @ 15% RH | % Water @ 32.3% RH | % Water @ 55% RH | % Water @ 85% RH |
|---|---|---|---|---|---|
| Polyplasdone ® XL (0% VA) | 4.2 | 7.2 | 11.3 | 18.6 | 32.3 |
| Plasdone ® S-630 (40% VA) | 2.6 | 3.5 | 6.2 | 10.8 | 22.6 |
| Crosslinked P(VP/VA) (24% VA) (Ex. 1) | 3.9 | 5.0 | 7.7 | 13.9 | 24.8 |
| Crosslinked P(VP/VA) (21% VA) (Ex. 3) | 3.8 | 4.8 | 8.4 | 14.6 | 27.1 |
| Crosslinked P(VP/VA) (23% VA) (Ex. 4) | 4.1 | 4.7 | 7.6 | 13.2 | 24.3 |

Figure 2:
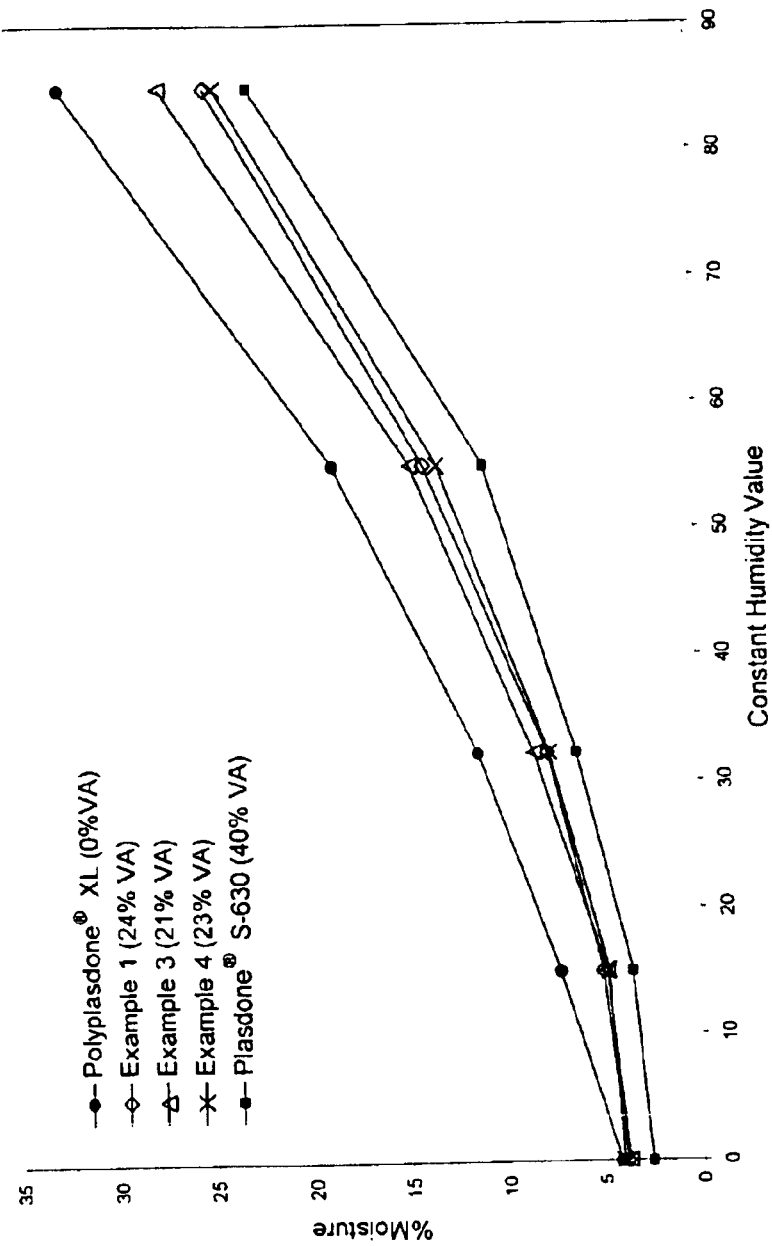
FIG. 2 is a graph of % Moisture taken up vs. Constant Humidity Value for proliferous copolymers of VP/NA of the invention compared to Polyplasdone® XL itself and non-crosslinked Plasdone® S-630, (40% VA).

The data in Table 3 is shown graphically in FIG. 2. The upward trend of the curve indicates that increasing the humidity value increases the amount of water absorbed by each material. Significant differences in hygroscopicity between samples of Polyplasdone® XL, Plasdone® S-630 and crosslinked P(VP/VA) copolymers of the invention are noted. The invention samples picked up less than 14.6% moisture at a constant humidity value of 55%, while the 0% VA sample picked up considerably more moisture (i.e. 18.6%). The higher VA content samples approached the performance of the 40% VA sample.

While the invention has been described with particular reference to certain embodiments thereof, it will be understood that changes and modifications may be made which are within the skill of the art. Accordingly, it is intended to be bound only by the following claims, in which:

What is claimed is:

1. A pharmaceutical tablet which exhibits rapid dissolution and disintegration of a drug therein and reduced hygroscopicity comprising a proliferous copolymer of vinyl pyrrolidone and vinyl acetate.

2. A pharmaceutical tablet according to claim 1 which releases at least 80% of the drug within 20 minutes and 100% within 35 minutes, under aqueous acidic conditions, and picks up less than 14.6% moisture at a constant humidity value of 55%.

3. A pharmaceutical tablet according to claim 1 in which said proliferous copolymer consists essentially of, by weight, about 60–90% VP, about 10–40% VA, and about 0.8–1.2% crosslinker.

4. A pharmaceutical tablet according to claim 3 in which said proliferous copolymer consists essentially of about 75–82% VP, about 18–25% VA and about 1% crosslinker.

5. A pharmaceutical tablet according to claim 3 wherein said crosslinker is ethylidene-vinyl pyrrolidone, divinyl imidazolidone, allyl methacrylate or N,N-methylene-bis-acrylamide.

* * * * *